Figures 3, 4:
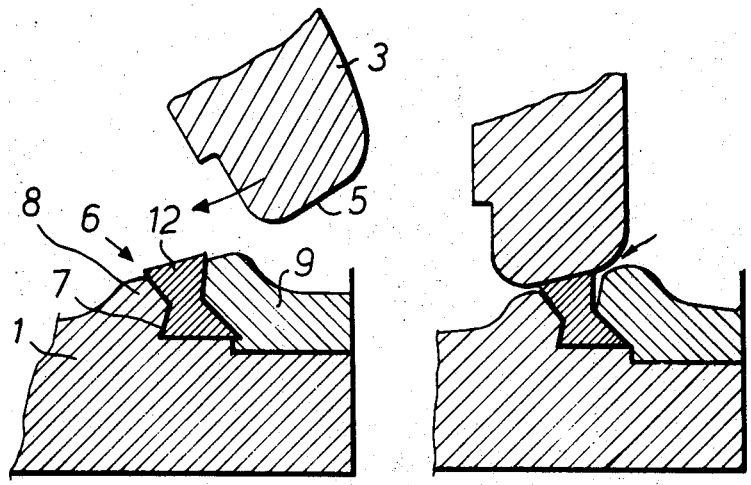

United States Patent

[11] 3,578,288

| [72] | Inventor | Erik Rishovd |
| | | Geithus, Modum, Norway |
| [21] | Appl. No. | 809,570 |
| [22] | Filed | Mar. 24, 1969 |
| [45] | Patented | May 11, 1971 |
| [73] | Assignee | A/S Westad Armaturfabrik |
| | | Geithus, Modum, Norway |
| [32] | Priority | Mar. 29, 1968 |
| [33] | | Norway |
| [31] | | 1211/68 |

[54] BUTTERFLY VALVE WITH A SEALING RING HAVING A DOUBLE SWALLOWTAIL SHAPE IN CROSS SECTION
4 Claims, 5 Drawing Figs.

| [52] | U.S. Cl. | 251/306 |
| [51] | Int. Cl. | F16k 1/22 |
| [50] | Field of Search | 251/171, 173, 298, 305—309 |

[56] References Cited
UNITED STATES PATENTS

| 3,144,040 | 8/1964 | White | 251/307X |
| 3,197,174 | 7/1965 | Killian | 251/307 |
| 3,282,558 | 11/1966 | Swain | 251/173X |
| 3,290,001 | 12/1966 | Taylor | 251/306X |
| 3,356,336 | 12/1967 | Maenaka | 251/306 |
| 3,393,697 | 7/1968 | Fawkes | 251/171X |
| 3,412,975 | 11/1968 | Kurkjian | 251/307X |

*Primary Examiner*—Henry T. Klinksiek
*Attorney*—Pennie, Edmonds, Morton, Taylor and Adams

ABSTRACT: A butterfly valve comprising a valve housing and a rotatable disc-shaped valve body, sealing means between the valve body and the valve housing with a resilient sealing ring disposed in an undercut groove in the valve housing respectively the valve body and a sealing surface on the valve body respectively the valve housing, cooperating with said sealing ring, the cross-sectional configuration of the sealing ring and the undercut groove being as a substantially double swallowtail.

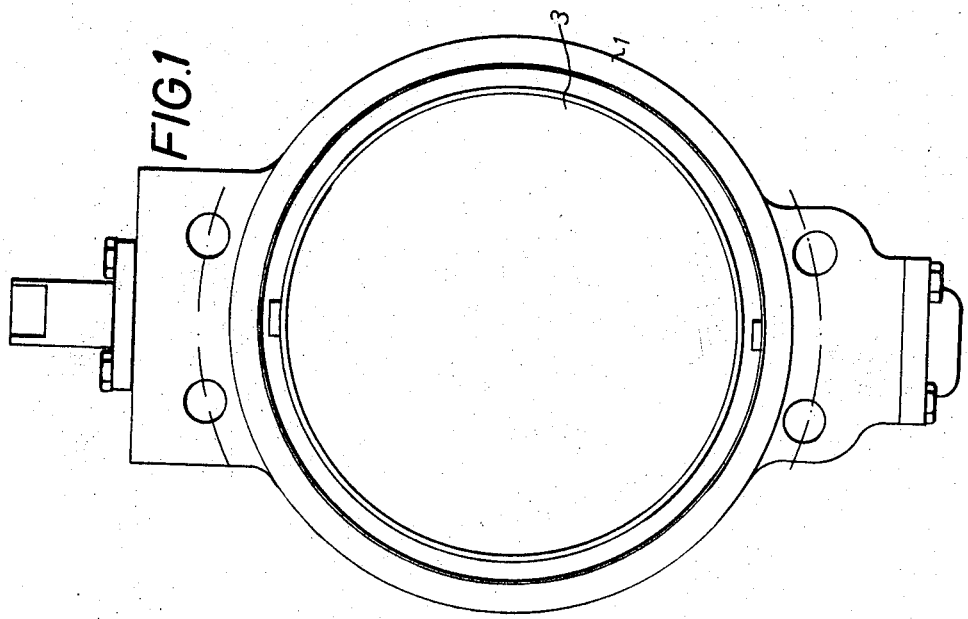
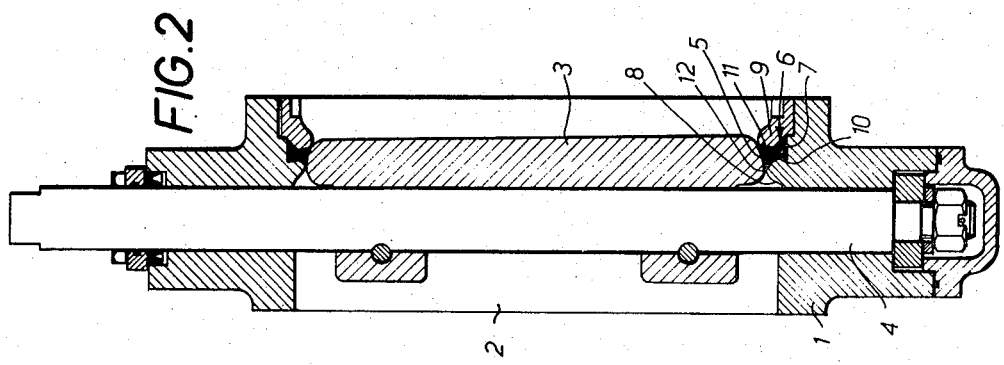

Patented May 11, 1971

3,578,288

2 Sheets-Sheet 2

INVENTOR.
Erik Rishoard
BY
Pennie Edmonds, Morton, Taylor & Adams
Attorneys 3,578,288

BUTTERFLY VALVE WITH A SEALING RING HAVING A DOUBLE SWALLOWTAIL SHAPE IN CROSS SECTION

The present invention relates to a butterfly valve comprising a valve housing, a disc-shaped valve body rotatably arranged in the valve housing and adapted to rotate to open and closed positions respectively, sealing between the valve body and the valve housing including a resilient sealing ring disposed in an undercut groove in the valve housing and the valve body respectively, and a sealing surface on the valve body and the valve housing respectively, cooperating with said sealing ring, and such that, when the valve is in use, the static pressure from the sealed-off medium presses the sealing ring to a closer bearing relationship against the sealing surface and against one or more of the walls of the recessed groove, the sealing effect of the sealing ring being thereby augmented.

There are many types of butterfly valves in existence, all being more or less efficacious, none of them can be said to satisfy fully the demands which can be made of such a valve, however. The most important requirements are as follows:

1. Secure sealing against all pressures in both directions.
2. Greatest possible durability, i.e., against wear and tear, and of retaining means for the sealing.
3. Reasonable opening and closing force.
4. Readily removable sealing ring (for repair and possible replacement of quality for the various media).
5. Reasonable production costs.

Among the butterfly valves on the market having different forms of sealing, the following may be mentioned:

1. Sealing which is vulcanized to the housing. This type of sealing has the following disadvantages: Great bias between sealing and valve body is necessary and great maneuvering force is then required. There is also great risk of leakage since the sealing is worn by the bias pressure and also by the penetration of foreign bodies. Further, it is expensive and difficult to replace the sealing, and the sealing is expensive to produce.

2. Sealing disposed in the valve or in the housing in the form of an O-ring or of approximately triangular form or the like.

The disadvantage or weakness of such types is that the O-ring is apt to be pressed out of the groove during the opening or closing phase. The sealing ring has a small wearing surface and the sealing surface is narrow and, since it is to seal in both directions, the ring is greatly deformed in places and is subject to great strain and is liable to damage. The life of the gasket or O-ring is then short. Sealing rings with an approximately triangular shape or the like are retained in the groove but have otherwise the same weaknesses as the O-ring or the like. Butterfly valves with axially displaceable sealing rings or valve bodies are sensitive to impurities and are expensive to produce.

The object of the present invention is to provide a butterfly valve which, to the greatest possible extent, meets the requirements described above, so that it overcomes to the greatest possible extent the said disadvantages or weaknesses. In accordance with the present invention this is achieved by using a resilient sealing ring which is of substantially double, swallowtail-shaped cross section and a correspondingly formed groove for the sealing ring so that the ring is retained in the recessed portion of the groove by means of one swallowtail portion, while the second swallowtail portion projects somewhat from the groove and bears against a sealing surface which cooperates with the sealing ring. By means of its special shape, the sealing ring when subjected to the static pressure occuring when the valve is closed is capable of great deformation so that it can be permitted to press against the cooperating sealing surface without risk of damage to the sealing ring, that is to say, that little bias is required between the sealing ring and the cooperating sealing surface. The lifespan of the sealing ring is greatly increased since a very large wearing surface is obtained by means of the above-said cross section. In addition the hydrostatic sealing and sealing pressure will, by reason of the cross section of the sealing ring, increase with the pressure from the medium since the sealing ring is pressed by the medium in between the two surfaces in the valve housing and the valve body, respectively, which form an acute angle. This is further described hereinafter in connection with the drawing. Furthermore, sealing in either direction is achieved with little deformation of the actual sealing ring which is as simple to replace as an O-ring, and the cost of production is decreased by reason of the simple construction of the valve.

The invention is thus characterized in that the cross-sectional configuration of the sealing ring and the undercut groove is substantially a double swallowtail, so that the sealing ring is retained in place by one swallowtail portion in the undercut portion of the groove, a part of the second swallowtail portion of the sealing ring projecting somewhat from the groove and bearing sealingly against the cooperating sealing surface when the valve body is in closed position.

The invention is more closely described in the following with reference to the drawing which shows an embodiment example, and the cooperation of the sealing ring with the sealing surface.

Figure 5:
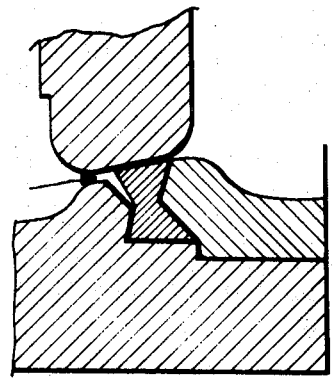

FIG. 1 shows a butterfly valve viewed directly into the through passage thereof, with the valve body in closed position, FIG. 2 shows the same viewed from the side and in section, and FIGS. 3, 4 and 5 in diagram form show the valve body in slightly open position, and in closed position with the static pressure of the medium in action in one way and the other respectively.

The butterfly valve in accordance with the invention is a generally conventional embodiment in that it consists of a valve housing 1 having a circular through-flow opening 2, wherein is disposed a disc-shaped valve body 3 which may be rotated about a shaft or journal 4 between a closed position, as shown on FIG. 2, and a fully open position at right angles to the first said position. The butterfly valve further comprises a sealing consisting of a sealing surface 5, which cooperates with a sealing ring 6, retained in an undercut groove 7.

In the embodiment described, the undercut groove 7 with the sealing 6 retained therein is mounted in the valve housing 1, the sealing surface corresponding to the peripheral edge surface of the valve body 3. The undercut groove 7 is formed in known manner by arranging a ring-shaped projection 8 in the valve housing 1 which forms one wall of the groove while the second wall is formed by a ring 9 which is inserted from one side of the valve housing 1 and is secured by suitable means.

This butterfly valve, which is known per se, is distinguished from other butterfly valves of the same type in that the sealing ring 6 has a double swallowtail cross-sectional configuration so that it is retained in the recessed groove by means of one swallowtail portion 10, the second swallowtail portion 11 projecting from the recessed groove 7 formed to correspond, and bears sealingly against the peripheral sealing surface 5 of the valve body 3. The sealing surface 12 of the sealing ring 6 is large, as will be apparent from FIG. 2, and no great bias between the sealing surface of the sealing ring and the sealing surface of the valve body is necessary. This means that the wear and tear on the sealing ring 6, on opening and closing of the valve, is comparatively slight and the lifespan of the sealing ring is greatly increased thereby.

By reason of the special cross-sectional configuration of the sealing ring 6, the static pressure in the sealed-off medium, when the valve is closed, deforms the gasket in known manner, and thereby increases this sealing pressure against the cooperating sealing surface 5, in that the static pressure acts on the side edge of the projecting portion of one swallowtail portion of the sealing ring, and that the said pressure, subsequent to the initial deformation of said swallowtail portion is transmitted down along the side surface thereof and presses said side surface against the sealing surface 5 and against an upper portion of one sidewall of the undercut groove 7, the said upper portion together with the sealing surface 5 forming an acute angle within which the sealing ring 6 is pressed so that it is retained in sealing contact with said sealing surface 5 and said upper portion of the groove 7.

The sequence of closing the valve and the deformation of the sealing ring one way or the other respectively, dependent upon the side from which the static pressure acts, is shown in FIGS. 3, 4 and 5. It is clearly apparent from FIGS. 4 and 5 that the deformation of the sealing ring 6 is not very great, nor is there any particular small portion thereof which is subjected to great deformation with consequently great wear and tear. As shown in FIG. 2 in the embodiment example, it is the entire sealing surface 12 which is pressed into contact with the sealing surface 5 in contrast to previously known sealing rings where only a relatively small portion of the sealing ring projects from the groove in which it is disposed, and which is thus subjected to great deformation under the action of the static pressure when the valve is in closed position.

With regard to the term substantially double swallowtail cross-sectional configuration of the sealing ring 6 this is intended to cover the shape of the sealing ring where the part of the ring retained in the recessed groove 7 can also be of circular, square or other cross-sectional configuration which is adapted to be retained in a recessed portion of the groove 7, while the sealing portion of the cross section is preferably a purely swallowtail shape, or trapeze-shape, so that a substantial part of the cross section of the sealing ring is displaced in one or the other direction into contact with the sealing surface 5 and the outer portion of the groove 7, under the action of the static pressure.

In accordance with the invention, therefore, a simple, robust and wear-resistant butterfly valve is provided where little torque is needed to bring the valve body in and out of closed position, and which further, is inexpensive to produce.

I claim:

1. A butterfly valve comprising a valve housing, a resilient sealing ring disposed in an undercut groove in the valve housing so that the sealing ring is maintained in place by the undercut portion of the groove, and a disc-shaped valve body rotatably arranged in said valve housing with its axis of rotation displaced with respect to the sealing surface of the sealing ring in the axial direction of the valve housing, wherein the valve body has a wide peripheral sealing surface, a substantial portion of which presents a flat sealing surface portion, and wherein the inner portion of the sealing ring has a substantially swallowtail shape in cross section located in and projecting from the inner portion of the groove, said inner portion of the sealing ring having a wide flat sealing surface adapted to cooperate with the flat sealing surface portion of the valve body, which is at least as wide as that of the sealing ring, the sealing surface portion of the valve body and the sidewall in the outer portion of the groove forming an acute angle into which the outer portion of the sealing ring is pressed in sealing relationship without any substantial deformation of the sealing ring in the outer portion of the groove.

2. A butterfly valve, as claimed in claim 1, wherein the outer portion of the sealing ring and the outer portion of the groove in which it is mounted have a substantially swallowtail shape in cross section.

3. A butterfly valve, as claimed in claim 1, wherein the sealing ring comprises inner and outer portions each having a substantially swallowtail shape in cross section, the sealing ring including a narrow neck portion joining the inner and outer portions.

4. A butterfly valve, as claimed in claim 1, wherein the inner portion of the sealing ring has a continuous flat, inner peripheral sealing surface and converging flat sides extending outwardly from the respective edges of the flat sealing surface.